(12) United States Patent
Weisenberg

(10) Patent No.: US 10,377,078 B2
(45) Date of Patent: *Aug. 13, 2019

(54) INVERTED FILAMENT WINDER FOR PIPELINE REHABILITATION

(71) Applicant: Sipp Technologies, LLC, Wichita, KS (US)

(72) Inventor: Kent Weisenberg, Fruit Cove, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,986

(22) Filed: May 10, 2018

(65) Prior Publication Data

US 2018/0326651 A1 Nov. 15, 2018

Related U.S. Application Data

(63) Continuation-in-part of application No. 15/647,777, filed on Jul. 12, 2017, now abandoned.

(60) Provisional application No. 62/635,794, filed on Feb. 27, 2018, provisional application No. 62/620,171, filed on Jan. 22, 2018, provisional application No. 62/504,006, filed on May 10, 2017.

(51) Int. Cl.
| | |
|---|---|
| *E03F 3/06* | (2006.01) |
| *F16L 1/26* | (2006.01) |
| *B29C 63/32* | (2006.01) |
| *B29C 63/02* | (2006.01) |
| *B29C 73/04* | (2006.01) |
| *B29C 63/12* | (2006.01) |
| *B29C 63/08* | (2006.01) |
| *F16L 55/18* | (2006.01) |
| *F16L 55/165* | (2006.01) |

(52) U.S. Cl.
CPC ............ *B29C 63/32* (2013.01); *B29C 63/024* (2013.01); *B29C 63/08* (2013.01); *B29C 63/12* (2013.01); *B29C 73/04* (2013.01); *F16L 55/1655* (2013.01); *F16L 55/18* (2013.01)

(58) Field of Classification Search
CPC .... E03F 2003/065; E21D 11/00; E21D 11/10; E21D 11/40; F16L 1/00; F16L 1/26; F16L 55/16; F16L 55/18
USPC ......... 405/184.1, 184.2, 154.1, 150.1, 150.2, 405/158; 138/97, 98, 15, 99, 105, 153, 138/172, 176, DIG. 5; 285/288.2; 264/228; 219/58, 61.1; 29/402.09, 29/402.18, 446, 452, 456
See application file for complete search history.

(56) References Cited

U.S. PATENT DOCUMENTS

| | | | | |
|---|---|---|---|---|
| 2,917,820 A | * | 12/1959 | Matheny | ............. B28B 19/0023 219/58 |
| 2,996,085 A | * | 8/1961 | Matheny | ................... B05C 7/02 138/97 |
| 3,328,224 A | * | 6/1967 | Aylor | ..................... B29C 70/16 156/382 |

(Continued)

*Primary Examiner* — Benjamin F Fiorello
*Assistant Examiner* — Edwin J Toledo-Duran
(74) *Attorney, Agent, or Firm* — Thomas C. Saitta

(57) ABSTRACT

A pipe lining apparatus having a settable, resin-impregnated reinforcement filament that is helically wound onto the inner surface of a pipe or pipe lining by an inverted filament winding apparatus, the apparatus having multiple spools and applicator arms to retain and apply the filament. The applicator arms may be aligned circumferentially or axially.

19 Claims, 12 Drawing Sheets

(56) References Cited

U.S. PATENT DOCUMENTS

| | | | | |
|---|---|---|---|---|
| 3,340,115 | A * | 9/1967 | Rubenstein | B28B 21/14 138/176 |
| 3,401,442 | A * | 9/1968 | Matheny | B28B 19/0023 140/2 |
| RE27,061 | E * | 2/1971 | Rubenstein | B28B 21/62 138/176 |
| 3,742,985 | A * | 7/1973 | Rubenstein | B28B 23/046 138/141 |
| 4,457,236 | A * | 7/1984 | Akhmadiev | F16L 55/18 104/138.2 |
| 4,558,971 | A * | 12/1985 | David | F16L 1/038 156/175 |
| 5,240,351 | A * | 8/1993 | Holmberg | F16L 1/12 405/158 |
| 5,779,948 | A * | 7/1998 | Perkins | B05C 7/04 138/97 |
| 5,799,701 | A * | 9/1998 | Kitahashi | B29C 53/584 138/154 |
| 6,561,229 | B2 * | 5/2003 | Wellman | F16L 9/14 138/132 |
| 6,637,092 | B1 * | 10/2003 | Menzel | B21C 37/121 264/36.16 |
| 6,773,773 | B2 * | 8/2004 | Hauber | B29C 53/64 138/172 |
| 7,926,516 | B2 * | 4/2011 | Wilson | F16L 55/1645 138/93 |
| 8,596,917 | B2 * | 12/2013 | Emmons | F16L 55/1655 138/129 |
| 2004/0013472 | A1 * | 1/2004 | Akimoto | F16L 55/1655 405/184.2 |
| 2008/0277012 | A1 * | 11/2008 | Anders | F16L 55/1651 138/98 |
| 2008/0277013 | A1 * | 11/2008 | Anders | F16L 55/1651 138/98 |
| 2009/0129869 | A1 * | 5/2009 | Zivanovic | F16L 55/1655 405/184.2 |
| 2011/0083766 | A1 * | 4/2011 | Anders | F16L 55/1651 138/98 |
| 2011/0280665 | A1 * | 11/2011 | Emmons | F16L 55/1655 405/184.2 |
| 2013/0280424 | A1 * | 10/2013 | Jedneak | B05C 7/08 427/236 |
| 2014/0216587 | A1 * | 8/2014 | Khalifa | F16L 55/18 138/97 |
| 2014/0356529 | A1 * | 12/2014 | Goodell | F16L 55/1655 427/236 |
| 2015/0247593 | A1 * | 9/2015 | Weaver | B29C 63/32 138/129 |
| 2016/0008857 | A1 * | 1/2016 | MacNeil | B08B 9/0433 134/22.12 |
| 2017/0081834 | A1 * | 3/2017 | Benedid | F16L 55/18 |

\* cited by examiner

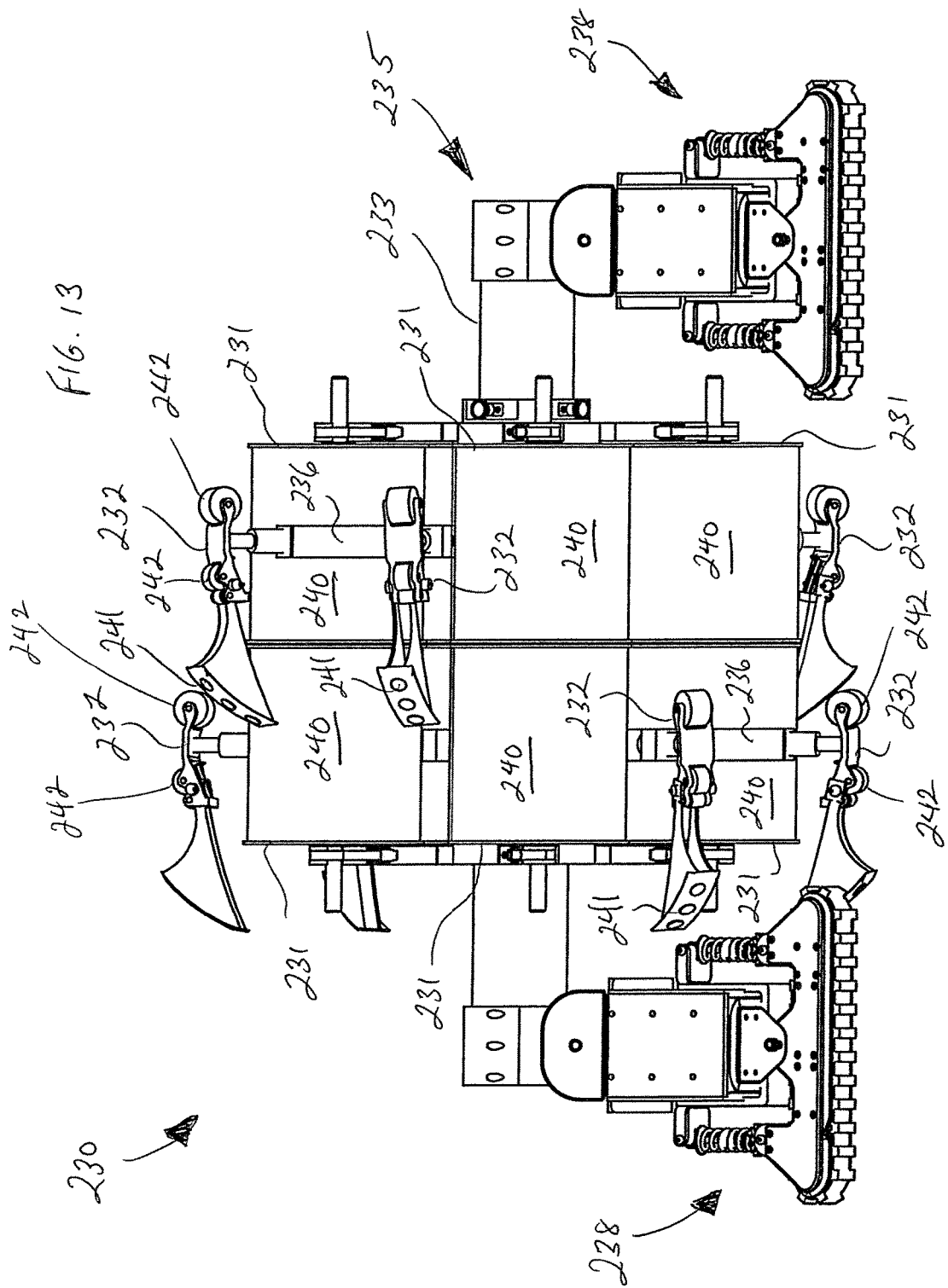

INVERTED FILAMENT WINDER FOR PIPELINE REHABILITATION

This application is a continuation in part of U.S. patent application Ser. No. 15/647,777, filed Jul. 12, 2017, which claims the benefit of U.S. Provisional Patent Application Ser. No. 62/504,006, filed May 10, 2017. This application also claims the benefit of U.S. Provisional Patent Application Ser. No. 62/620,171, filed Jan. 22, 2018, and U.S. Provisional Patent Application Ser. No. 62/635,794, filed Feb. 27, 2018.

BACKGROUND OF THE INVENTION

This invention relates generally to methods and apparatuses for applying lining structures to internal pipe surfaces, and more particularly relates to such methods and apparatuses wherein the linings include wound reinforcement filaments applied to internal tubular surfaces, i.e., inverted winding, and even more particularly relates to such methods and apparatuses wherein the linings are adapted and adaptable for use in the structural repair or remediation of degraded, damaged or leaking pipes, or such linings are adapted and adaptable to improve or upgrade qualities and characteristics of pipes prior to or after use or installation. In particular, the invention relates to apparatuses and methods for applying a unidirectional or bidirectional wound filament as a component of the multi-layer lining such that the lining possesses significantly increased hoop strength, beam bending strength and significantly reduces the potential for lining creep failure.

Typically, when municipal engineers, reliability engineers, and other end users search for rehabilitation or preventative maintenance solutions for water or industrial pipes, they highly prefer a "no dig"/trenchless solution which is much cheaper than the other types of methods so the users will not be constrained by the budgets. Many end users/clients would also prefer to spend money on a long-term pipe rehabilitation that closely duplicates the design of their original pipe system. Additionally, trenchless pipe rehabilitation has little negative impacts on the surrounding areas of the pipeline system since it only needs to make a few openings on the pipes to let the lining device get into them and most of the rehabilitation process is finished underground. There are many known compositions for internal pipe linings that provide improved properties or may be used to repair degraded or damaged pipes already in use. A cured-in-place pipe (CIPP) is one of several trenchless rehabilitation methods used to repair existing pipelines. In CIPP application, a resin-saturated felt tube made of polyester, fiberglass cloth or a number of other materials suitable for resin impregnation, is inverted or pulled into a damaged pipe first, then hot water, UV light, ambient cured or steam is used to cure the resin and form a tight-fitting, joint less and corrosion-resistant replacement pipe. Another important trenchless pipe rehabilitation method is referred to by the acronym SIPP, which stands for sprayed-in-place pipe, and application of the linings typically involves single or multiple passes of equipment applying one or more polymeric material layers to the interior of the pipe to form a "pipe-in-a-pipe". There are, however, many problems or drawbacks associated with these lining methods.

While CIPP can repair a pipe with limited bend geometries, sags or deflections, this lining method cannot completely prevent wrinkling and stretching. Except for very common sizes, CIPP liners are not usually stocked and must be made specifically for each project. The liner material used for common sizes is normally a felted fabric (non-woven) or a bi-directional fabric and does not go around bends well without wrinkling and going out of round on corners. These wrinkles and defects can seriously reduce the liner strength against internal pressure loads and cause lining cracking and leaking issues. If the CIPP liner material is designed to have shorter circumference compared to the host pipe to remove wrinkles, this will create small annuluses or circumferential gaps between the liner and the host pipe into which water and/or effluent will infiltrate. In contrast, SIPP can spray polymeric lining materials directly onto pipe wall to create liners without wrinkles or folds, and this lining method can also get rid of annuluses or circumferential gaps between the liner and the host pipe via applying multi-layer liner structure (references if need). However, current SIPP technologies or any other pipeline rehabilitation technologies that utilize polymerics or more specifically thermosetting plastic materials as the structural member/barrier for the containment of pressurized fluid in an existing host pipe are constrained to the creep failure behavior of the polymeric materials under long term continuous stress. The large nonlinear stress-strain behavior of thermoplastic polyurethanes exhibits strong hysteresis, rate dependence and softening. There is no technology available in the SIPP market that can be applied to meet the structural requirements of AWWA M28 for class IV lining for pressure pipe. This holds true for many other pipe lining/pipe rehabilitation technologies as well. To overcome this issue many SIPP vendors try to increase the lining structure wall thickness which is not cost effective and it will reduce the cross-sectional diameter and the flow capacity of the rehabilitated pipes. The higher wall thickness needs more application time, which will add the potential for application error and mechanical failure while lining. Additionally, and maybe most importantly, current thermosetting polymers used in lining industries cannot be applied as one single thick membrane in large diameter pipes (diameter>10") due to the exothermic reaction and the resulting tertiary stage induced by the internal stresses in the component. This results in the requirement of application in multiple layers which means multiple passes of the lining device which equates to significant increase in time and cost. Cost is not the only detriment to applying linings in multiple passes, other potential ramifications that can lead to failure are lack of inter-coat adhesion from passing the "recoat" window of the polymeric materials, infusing debris, dust or moisture from the outside environment via being pulled into the pipe over the preceding liner coat by the umbilical.

Creep is the tendency of a solid material to move slowly or deform permanently under the influence of mechanical stresses. It can occur as a result of long-term exposure to high levels of stress that are still below the yield strength of the material. The rate of deformation (strain rate) is a function of the material properties, exposure time, exposure temperature and the applied structural load. In the initial creep stage of loading of ductile material the creep rate decreases rapidly with time and then reaches the secondary stage where the deformation rate slows down and becomes steady unless exposed to high stresses that exceeds material yielding strength. In the tertiary stage, the strain rate exponentially increases with stress because of necking phenomena or internal voiding decreases the effective area of the material. Strength is quickly lost in tertiary stage while the material's shape is permanently changed and fractures will happen finally. Due to the nature of polymeric materials SIPP liners probably can meet the requirements of structure strength for short-term period but the material strength will decrease severely and the liner will start creeping till failure after a long-term use.

For potable water applications, the internal pipe lining is required to meet the American Water Works Association (AWWA) standards and in particular the standards set out below. Class IV linings are the strongest structural pipe linings of which the internal pressure and external load resistance capabilities do not rely on the material adhesion on the host pipe and the structural support from the pipe wall. This type of lining possesses the following characteristics:

4.2.4 Class IV Linings.
4.2.4.1 Class IV linings, termed fully structural or structurally independent, possess the following characteristics:
1. The lining has a long-term hoop strength which equal to or greater than the MAOP of the pipe to be rehabilitated. This hoop strength is tested independently from the host pipe.
2. The lining has long-term resistance to external and live loads and the resistance is independent from the host pipe.
3. The lining has a short-term hoop strength which equal to or greater than all short-term loads, such as sustained and surge (vacuum and occasional and recurrent surge) pressures and live loads even if these loads are in excess of the capacity of the host pipe. This hoop strength is tested independently from the host pipe.
4.2.4.2 Class IV linings are sometimes considered to be structurally equivalent to new replacement pipe, although such linings will have markedly different properties in terms of buckling and longitudinal bending resistance than the original host pipe. These linings should be designed with adequate load resistance for all reasonable assumptions of loading conditions independent of the host pipe. By necessity, they will be of smaller internal diameters than the host pipe. However, their design should also consider practical implications to facilitate the continued service objectives of the host pipe such as the ability to provide water to service lines and mains without compromising the hydrostatic integrity of the overall lining system. (See AWWA M28, Chapter 11-3rd ed.)
4.2.4.3 Class IV linings can also be used in circumstances similar to those for Class II and III, but their use is essential for host pipes suffering from generalized external corrosion where the mode of pipe failure has been, or is likely to be, longitudinal cracking. The host pipe suffers full loss of hoop strength because of the longitudinal crack. Other catastrophic modes (e.g. spiral cracks, circumferential cracks, a leadite style joint failure blow-out) can also happen on the pipe wall where more liner structural resistance is required than traditional hole spanning structural resistance.
4.2.4.4 Some available pipe rehabilitation technologies can offer Class II, Class III and even Class IV linings, while a given lining system may be rated as Class IV for MAOP levels up to a threshold value and as a Class II and III system at higher pressures.

It is an object of this invention to provide an apparatus and methodology for producing an internally wound helical or axial filament winding reinforcement on the interior surface of a tubular member. It is a further object to provide an apparatus and methodology for producing a multi-layer internal pipe lining structure having filament winding as a reinforcement element to increase the lining structure strength, more specifically hoop strength and to address the various problems and shortcomings of lining material creeping discussed above. It is a further object to provide an apparatus and methodology for applying a filament reinforcement comprising a UV-curable, heat-curable or similar resin and curing the filament reinforcement by exposing the filament to UV light or heating elements during the winding application process.

SUMMARY OF THE INVENTION

This invention provides in various embodiments an apparatus and methodology to form a pipe lining structure which is composed of one or more lining material layers and a spirally or helically wound or axially extending reinforcement filament embedded on or between the layers. In a representative lining process, an elastomeric layer is applied to the interior of a pipe, then an inverted wound layer made of high-strength, settable resin-impregnated fibers or similar members in the form of a continuous filament (i.e., a string, wire, thread, cloth or bundle of fibers) is adhered to the elastomeric layer by the apparatus of the invention, and finally a second rigid layer is sprayed on top of the elastomeric layer and the winding to form the composite lining structure. The filament winding is "sandwiched" between the lining layers, and since the winding material has much higher modulus and tensile strength compared to the rigid lining material it will share and reduce the total stress on the rigid lining when applying internal pressure loads on the rehabilitated pipe. As a result of the presence of the filament winding in the lining structure, the stress on the rigid liner will decrease significantly compared to that of a rigid liner without filament winding in the same liner wall thickness. The reduction of lining structure stress can increase the working life of the liners against creep failure.

The filament winding is made of fibers or similar members saturated, for example with a UV-light-cure or heat-cure resin composition, forming a prepreg filament that is applied to the interior of the elastomeric first layer of the lining by a filament winding apparatus advancing through the pipe bore. The apparatus comprises a rotating applicator arm incorporating a filament setting element, in one exemplary embodiment presented a UV light, the applicator arm being radially extensible and retractable relative to the configuration of the pipe wall, such that the end of the arm maintains close proximity to the interior of the first liner layer. The filament winding is retained on a spool and fed out through the applicator arm so as to be wound in a helical or spiral manner onto the first liner layer. In an alternative embodiment, the apparatus comprises a plurality of spools and a plurality of applicator arms.

The filament setting element, such as a UV-light, infrared light, heating element, etc., is mounted at or adjacent the end of the applicator arm and initiates resin setting or curing on the surface of the prepreg filament, thereby creating a tacky or adhesive surface which adheres to the surface of the first liner layer to retain the filament winding in place. Additional filament setting elements may be annularly mounted to the exterior of the apparatus in order to more fully set the resin. The resin may be a hybrid of UV-curable resin and heat-curable resin, such that the UV light cures the prepreg filament so as to be sufficiently rigid to withstand the weight of the wheeled apparatus as it advances in the pipe and the prepreg filament is subsequently fully cured by heating, such as by the exothermic heat produced by the curing of the rigid layer applied onto the first layer and the partially cured filament winding, or by providing additional heating elements, infrared light, etc.

Alternatively expressed, the invention may be summarized as an inverted filament winder apparatus adapted to apply a filament to the interior wall of a pipe or pipe liner having a longitudinal central axis, said apparatus comprising: a non-rotating carriage comprising a rotating assembly and a transport assembly; a plurality of spools circumferentially mounted to said rotating assembly, each of said spools adapted to retain a length of settable filament; an applicator arm associated with each spool, whereby filament is passed through said applicator arm to be applied to the interior of a pipe; wherein said spools and said applicator arms rotate circumferentially about said rotating assembly when said rotating assembly is rotating. And further, wherein said rotating assembly comprises a central shaft and a motor; wherein said transport assembly comprises rolling members, said transport assembly adapted to transport said carriage through a pipe; further comprising filament setting elements and press rollers; wherein said filament setting elements and press rollers are disposed on said applicator arms; said filament setting members being chosen from the group of filament setting members consisting of UV-lights, infrared lights, and heating elements; wherein said rotating assembly comprises an axis oriented parallel with the central axis of the pipe or pipe liner; wherein said central shaft comprises an axis oriented parallel with the central axis of the pipe or pipe liner; wherein said applicator arms are spaced in the axial direction in offset manner; wherein said applicator arms are re-positionable in the axial direction to adjust the offset spacing of said applicator arms; wherein said filament setting elements and press rollers are aligned circumferentially; and/or wherein said filament setting elements and press rollers are aligned axially.

Alternatively summarized, an inverted filament winder apparatus adapted to apply a filament to the interior wall of a pipe or pipe liner having a longitudinal central axis, said apparatus comprising: a non-rotating carriage comprising a rotating assembly and a transport assembly; said rotating assembly comprising a central shaft and a motor, said central shaft having an axis, said motor adapted to rotate said central shaft about said central shaft axis; a plurality of spools circumferentially mounted to said rotating assembly, each of said spools having an axis being parallel to said central shaft axis, each of said spools being adapted to retain a length of settable filament; an applicator arm associated with each spool, whereby filament is passed through said applicator arm to be applied to the interior of a pipe; filament setting elements and press rollers; wherein said spools and said applicator arms rotate circumferentially about said rotating assembly when said central shaft is rotating. And further, wherein said applicator arms are spaced in the axial direction in offset manner; wherein said filament setting elements are disposed on said applicator arm and wherein said filament setting members are chosen from the group of filament setting members consisting of UV-lights, infrared lights, and heating elements; wherein said filament setting elements and press rollers are aligned circumferentially; and/or wherein said filament setting elements and press rollers are aligned axially.

BRIEF DESCRIPTION OF THE DRAWINGS

FIG. 13 is a side view of the multi-spool embodiment of FIG. 12.

DETAILED DESCRIPTION OF THE INVENTION

With reference to the figures, which are meant to be non-limiting as to the scope of the invention and which are not to scale, the inventive methodology and an apparatus are described in various embodiments. The term "filament" as used herein shall mean an elongated member such as a string, wire, thread, ribbon, cloth strip, bundle or of fibers, such as carbon fiber or fiberglass for example, or similar members, and the terms "impregnated" or "prepreg" as used herein shall mean that a filament is coated or infused with a curable or settable resin, which is settable with the application of UV-light, infrared light, heat, etc.

Figure 1:
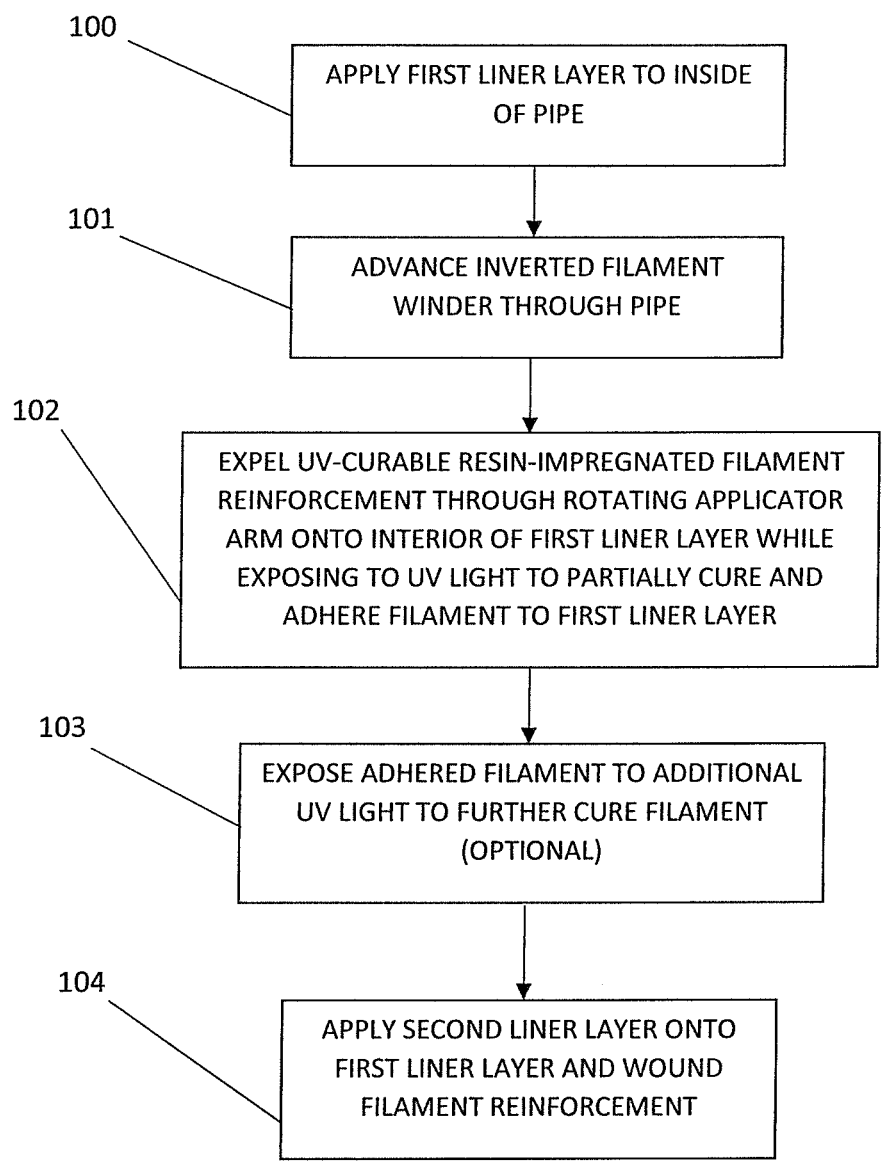
FIG. 1 is a flow chart illustrating an embodiment of the method of forming a multi-layer pipe liner comprising wound filament reinforcement.

The method comprises, in a first embodiment shown in FIG. 1, the steps of applying 100 a first liner 11 to the inside of a pipe 20, advancing 101 an inverted filament winder through the pipe 20, expelling 102 UV-curable resin-impregnated filament reinforcement 14 through a rotating applicator arm 32 onto the interior of the first liner layer 11 while exposing the filament 14 to UV light to partially cure or set and adhere the filament 14 to the first liner layer 11, (optionally) exposing 103 the adhered filament 14 to additional UV light to further cure the filament 14, and applying 104 a second liner layer 12 onto the first liner layer 11 and the wound filament reinforcement 14.

Figure 2:
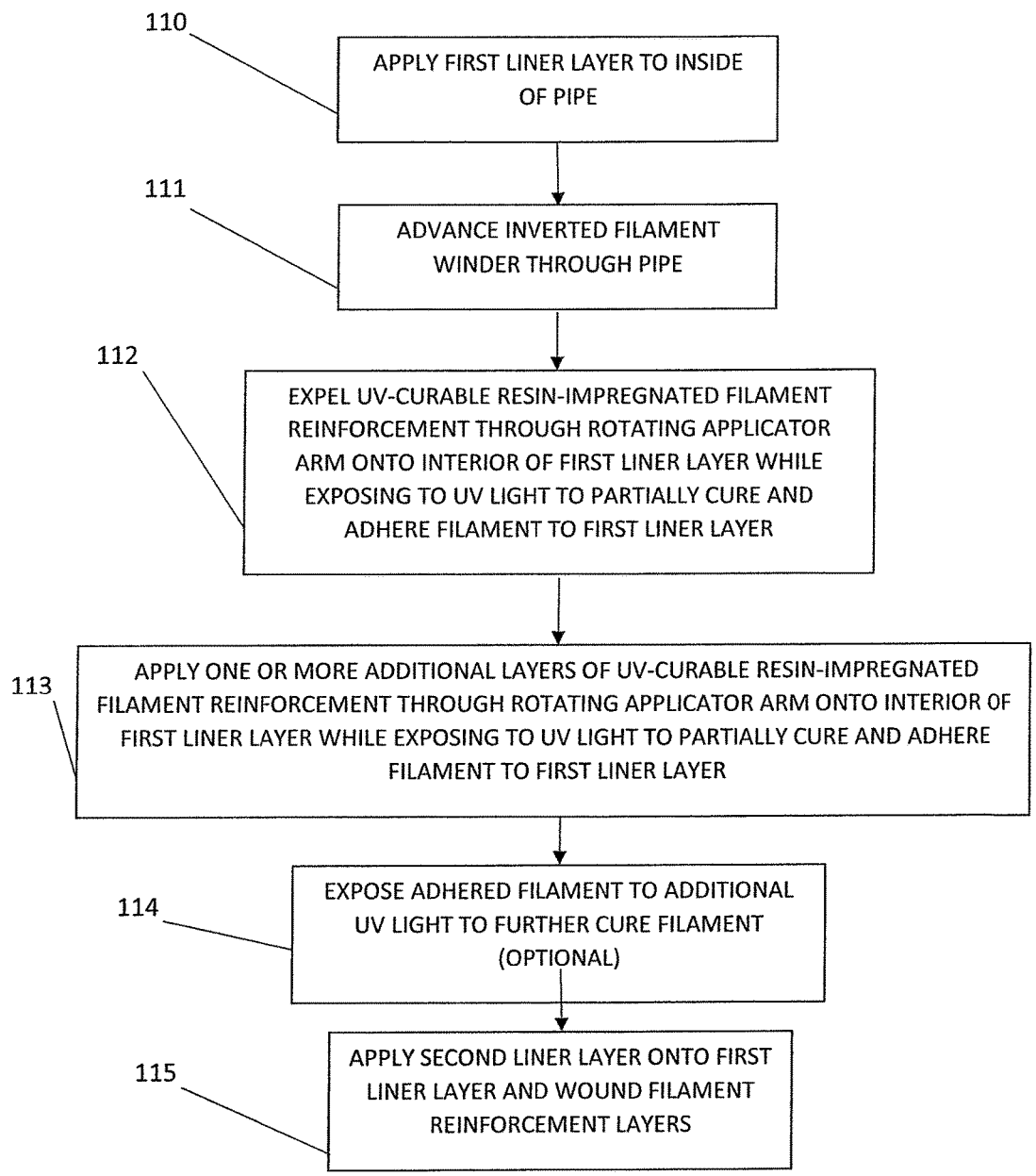
FIG. 2 is a flow illustrating a second embodiment of the method of forming a multi-layer pipe liner comprising wound filament reinforcement, wherein plural layers of wound filament reinforcement are applied.
Figure 3:
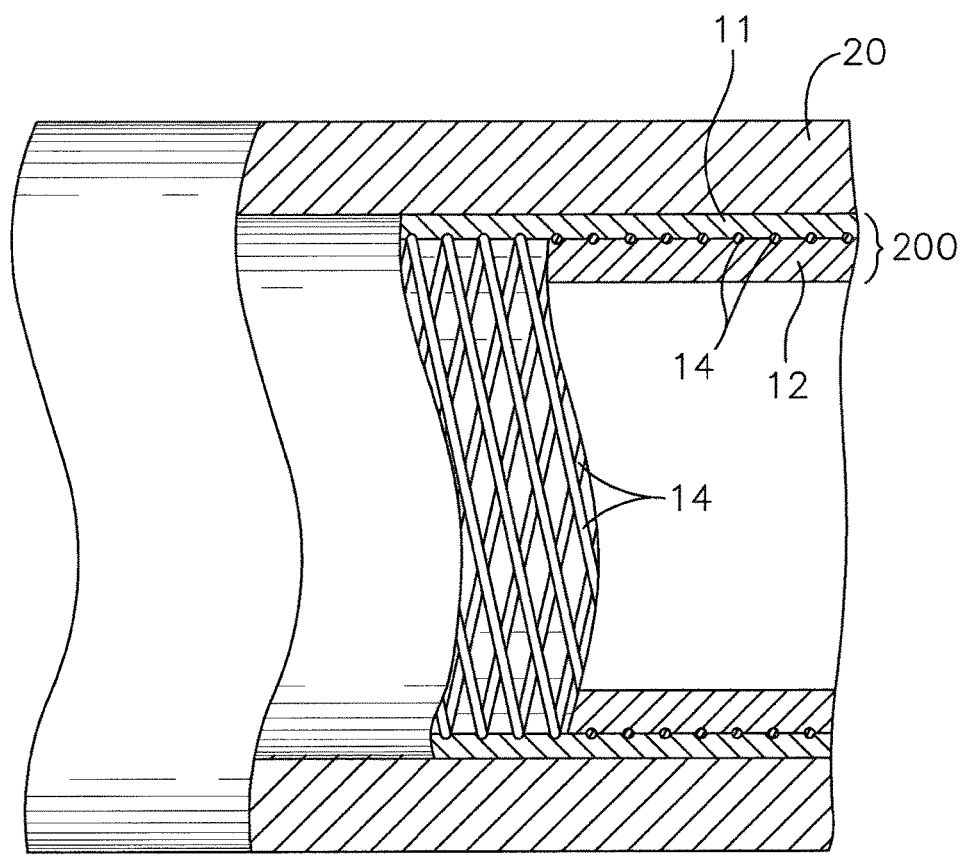
FIG. 3 is a partially exposed, partially cross-sectional view of a multi-layer pipe liner in place within a pipe.
Figure 4:
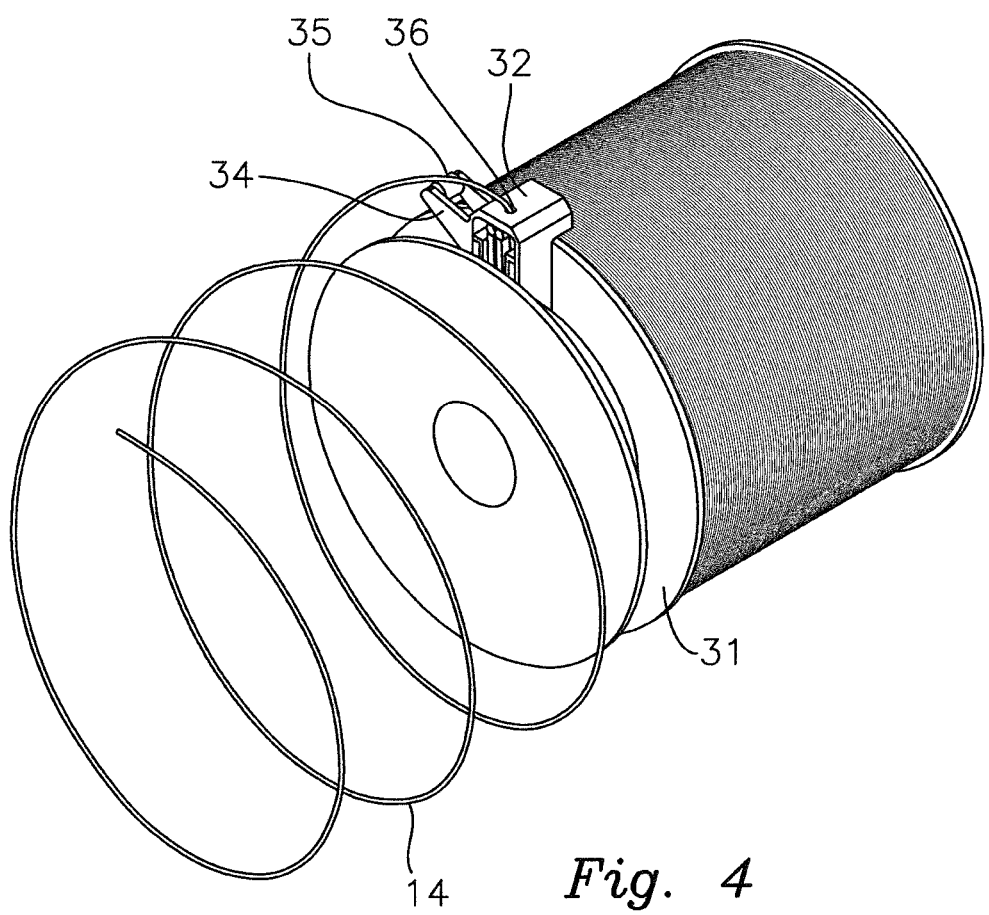
FIG. 4 is an illustration of an embodiment of the spool and applicator arm of the inverted filament winder apparatus, the spool being loaded with prepreg filament.
Figure 5:
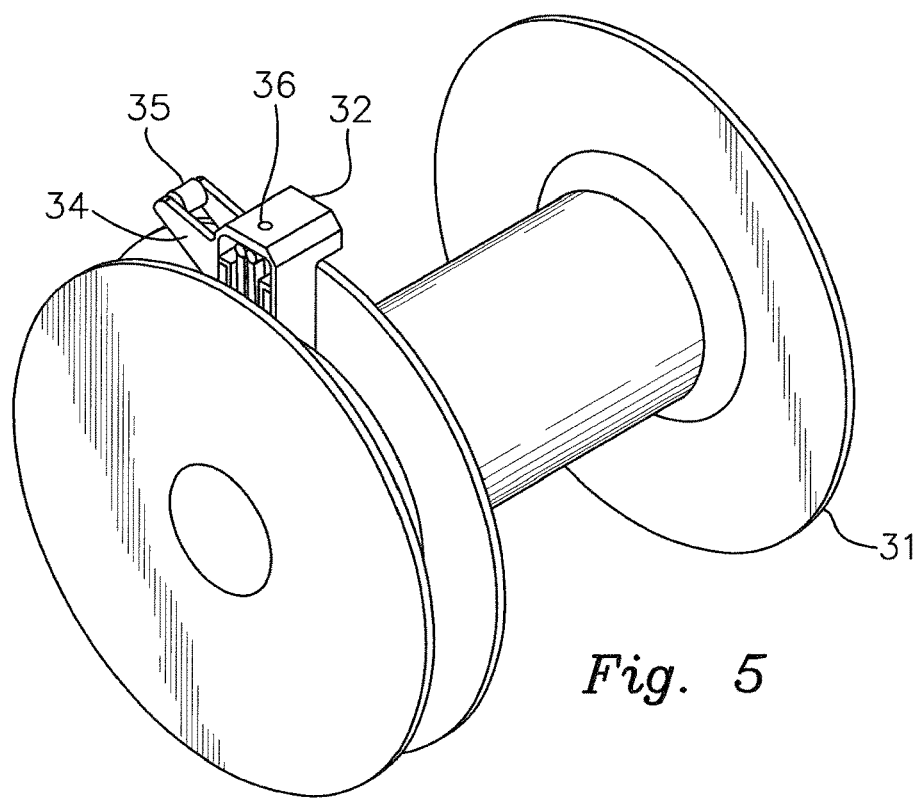
FIG. 5 is an illustration similar to FIG. 4 of an unloaded spool.
Figure 6:
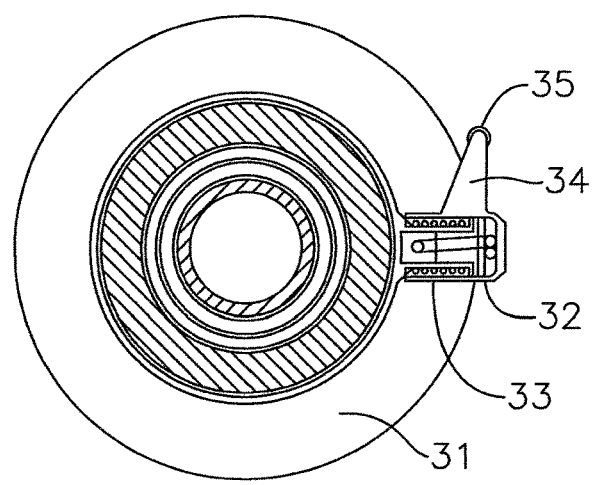
FIG. 6 is a cross-sectional end view of the spool and applicator arm of FIG. 4, taken along line 6-6.
Figure 7:
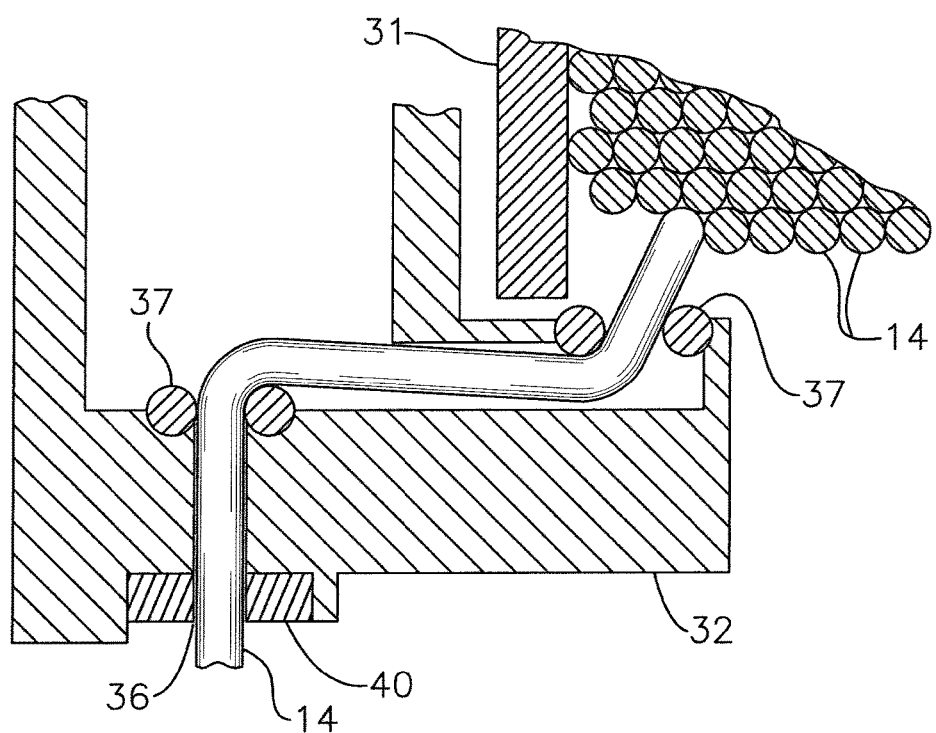
FIG. 7 is a partial cross-sectional view of the spool and applicator arm of FIG. 4.
Figure 8:
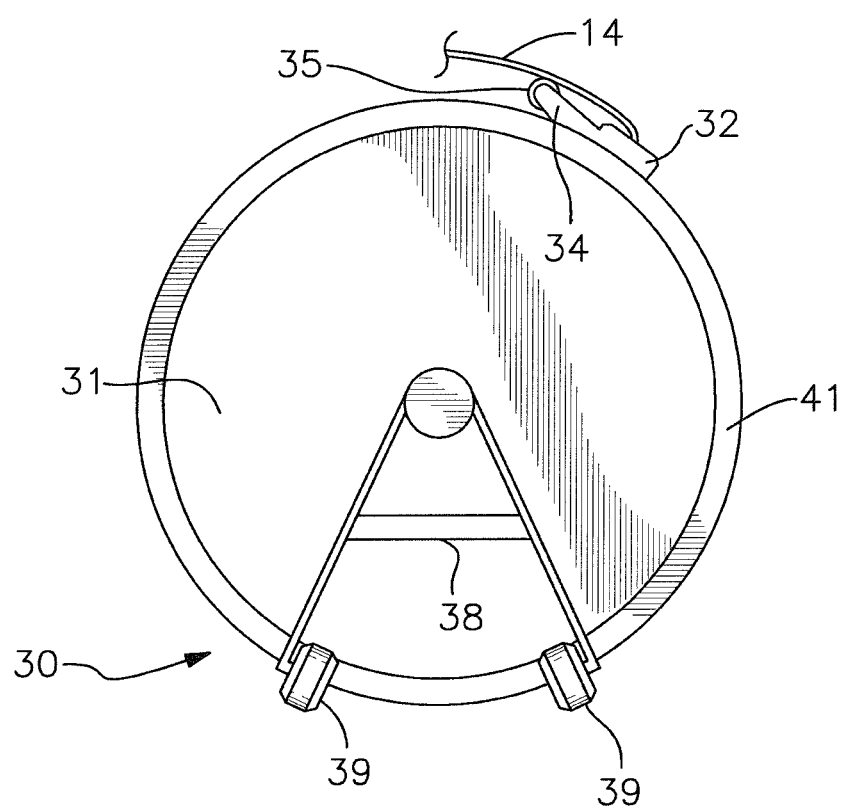
FIG. 8 is an end view of a basic embodiment of the inverted filament winder apparatus.

The method, in a second embodiment shown in FIG. 2, comprises the steps of applying 110 the first liner 11 to the inside of the pipe 20, advancing 111 the inverted filament winder through the pipe 20, expelling 112 UV-curable resin-impregnated filament reinforcement 14 through the rotating applicator arm 32 onto the interior of the first liner layer 11 while exposing the filament 14 to UV light to partially cure or set and adhere the filament 14 to the first liner layer 11, applying 113 one or more additional layers of UV-curable resin-impregnated filament reinforcement 14 through the rotating applicator arm 32 onto the interior of the first liner layer 11 while exposing to UV light to partially set and adhere filament 14 to the first liner layer 11, (optionally) exposing 114 the adhered filament 14 to additional UV light to further set the filament 14, and applying 115 the second liner layer 12 onto the first liner layer 11 and the wound filament reinforcement 14.

Furthermore, it is to be understood that the methods discussed above are representational, and the method may consist of utilizing the inverted filament winding apparatus to deposit the UV-curable resin impregnated filament 14 in helical fashion onto the interior surface of any tubular member with simultaneous setting of the resin, e.g., directly onto the interior of a pipe itself. Likewise, the method may utilize a heat-curable resin or alternative filament adhesive members in place of, combined with or in addition to the UV-curable resin.

In a non-limiting representative embodiment, the method produces a multi-layer or laminate pipe liner 200 with filament winder reinforcement 14 disposed or embedded between two liner layers 11/12. As a representative and non-limiting example, the liner 200 may comprise a first or outer tubular layer 11 composed of a low modulus, high elongation, flexible, elastomeric material disposed within and bonded to a pipe 20, a second or inner tubular layer 12 disposed within and bonded to the first layer 11 and which is composed of a rigid, durable, thermoset polymeric material, and one or more wound resin-impregnated (prepreg) filaments 14 possessing high-strength (>4500 MPa), high modulus (>200 GPa), low elongation (<2%) that is sandwiched between the first and second layers 11/12.

The pipe 20 defines a longitudinal or axial direction, i.e., the direction of the central axis of the pipe 20, which is also the direction of travel of the apparatus 30. Before starting the pipe lining process for in-situ pipes 20 being repaired or lined, the pipe 20 should be cleaned using conventional methods, such as blasting and pigging, etc. The pipe 20 is then lined internally, preferably by spray application, with a polymeric material to form the first or elastomeric liner layer 11. The first liner layer 11 is most preferably approximately 1-12 mm in thickness upon curing, with the optimal thickness being determined by pipe diameter. The first layer 11 mechanically bonds to the inner surface of the pipe or conduit 20, which may be composed of metal, polymer or concrete.

The prepreg filament winding 14 is then applied to the interior of the first layer 11 using an inverted filament winding apparatus 30, as illustrated in FIGS. 4-8. The apparatus 30 is "inverted" in the sense that the filament 14 is wound onto the interior of a tubular member as opposed to being wound externally onto the exterior of a cylindrical or tubular member. The filament winding apparatus 30 comprises a non-rotating carriage or frame 38 that is typically provided with rolling members 39, such as wheels, rollers, treads, sleds or the like, such that the winding apparatus 30 may be pulled, pushed or powered through the pipe 20. The rolling members 39 are adapted to reside beneath and support the carriage 38 as it transitions through the pipe. The winding apparatus 30 further comprises a spool 31 which retains the uncured prepreg filament 14, the spool 31 preferably oriented with its axis of rotation parallel to the axis of travel of the winding apparatus 30 through the pipe 20 in order to prevent the imparting torsional stresses on the filament 14 as it is unwound from the spool 31.

In one embodiment, the filament 14 is impregnated with the UV-curable resin, or a hybrid resin comprising a UV-curable resin component and a heat curable resin component (such that exothermic heat resulting from the curing of the rigid layer 12 performs the final curing of the resin-impregnated filament 14 after the initial curing by exposure to UV light), prior to disposition of the prepreg filament 14 on the spool 31. Alternatively, the apparatus 30 may be constructed such that the resin is coated or infused on or into the filament 14 within the apparatus 30 prior to delivery of the filament 14 through the applicator arm 32.

The winding apparatus 30 further comprises an applicator arm 32 extending radially outward beyond the circumference of the spool 31, the applicator arm 32 being powered for rotational movement about a centrally located axis parallel to the axis of travel of the winding apparatus 30 through the pipe 20. A follower arm 34 and follower roller 35 extend generally laterally from the end of the applicator arm 32, such that as the filament 14 is expelled through the aperture 36 at the end of the applicator arm 32, the follower roller 35 passes over the filament 14 to press it against the inner surface of the first liner layer 11 for better adhesion. The applicator arm 32 is structured to include an extension/retraction mechanism 33, i.e., a structure that allows for the lengthening and shortening of the applicator arm 32 in the radial direction, the extension/retraction mechanism 33 preferably being automatically responsive to changes in the interior diameter of the interior pipe wall 20 or any other inner surface, such as a mechanism comprising the telescoping structure and spring assembly shown in FIG. 6, a gas cylinder, equivalent mechanical constructs, or the like. This allows the follower roller 35 and the applicator arm 32 to adapt to imperfections in the interior pipe wall 20 and/or in the inner surface of the first liner layer 11 by moving radially inward or outward as needed. Powered feed rollers 37 are disposed within the applicator arm 32 to pull the filament 14 from the spool 31 and deliver it through the applicator arm aperture 36.

A filament setting element 40, in this example a UV light, is positioned on, at or adjacent the end of the applicator arm 32 such that the prepreg filament winding 14 is exposed to UV light as it is expelled from the applicator arm 32 and is pressed onto the first liner layer 11 by the follower roller 35. This exposure initiates curing or partially cures the UV-curable resin present in the filament 14, producing a tacky or temporarily adhesive surface that adheres and bonds the filament winding 14 to the first liner layer 11. With this methodology, apparatus and composition, the pre-cured filament 14 being deposited remains in a pliable, easily-handled state, as opposed to the stiff wire reinforcement required in earlier systems, the stiffness of the wire being necessary to maintain it in the expanded helical configuration. In one embodiment, an annular ring of UV lights 41 are positioned on the apparatus 30 such that additional curing of the filaments 14 now affixed to the inner wall of the first layer 11 occurs as needed. In another embodiment, the resin utilized for the filaments 14 is a hybrid resin comprising a UV-curable resin component and a heat curable resin component, such that final curing of the filaments 14 occurs by "shadow" curing when the second layer 12 is applied, the heat from the exothermic curing reaction of the second layer 12 providing the heat to cure the heat-curable resin and rigidify the wound filament 14. Alternatively, heating devices or other filament setting elements may be positioned on the apparatus 30, preferably on the applicator arms 32.

The filament 14 is spirally or helically wound onto the first layer 11. The pitch and spacing of the wound filament 14 is determined by the advancement speed of the filament winder apparatus 30 and the rotational speed of the applicator arm 32, such that the method may produce a tightly spaced spiral or a more open spiral. In addition, multiple passes may be made through the pipe 20, or multiple filament winder apparatuses 30 may be utilized to deliver a plurality of helical windings 14. The additional windings 14 may be deposited between or cross over the first winding 14.

Since it is required to wind the filament 14 inside the host pipe 20 during the application process, the filament 14 is preferably retained on a spool 31 and stored in the apparatus 30. In this way, the filament 14 can be unwound directly from the rotatable spool 31 and adhered onto the elastomeric first liner 11 following linear and rotational motion of applicator arm 32 to create the helical filament shape. Alternatively, the filament 14 may be stored on a spool external to the pipe 20 and delivered to the applicator arm 32, in which case the winding direction of the filament 14 should be kept alternating in the application process, i.e., the filament 14 will be wound in one direction for a certain amount of rotations, then it will be wound in the opposite rotating direction but move in the same lining direction. The alternating winding motions can also avoid the filament 14 from winding and accumulating on the winding apparatus 30. The pitch distance (typically 0.5"-16") of the wound filament 14 and the size/diameter (typically 0.02"-0.50") of the filament 14 will usually depend on the host pipe 20 diameter and the internal working pressure—based on the thickness of the liner 200 vs. the surface area of the unreinforced liner 200 that can resist the stress between the reinforcement filament 14 pitches at the given pressure.

A preferred curing time for the filament winding 14 is in the range of 0.1 to 3 seconds depending on the pipe size and the speed of the rehabilitation lining process. After the helically wound filament 14 is sufficiently cured, the rigid lining material layer 12 is then sprayed on top of the elastomeric layer 11 and the filament winding 14. The second layer 12 preferably has a snap cure rate of approximately 3 to 300 seconds and a final or full cure rate or 1 hour to 24 hours and is applied at a thickness of approximately 3 to 100 mm, dependent on the host pipe size.

The application of elastomeric layer 11, filament winding 14 and rigid layer 12 can be finished in the same lining pass with an apparatus comprising the necessary functionalities or in separate passes by separate apparatuses, but the winding of filament 14 must be finished before the rigid lining application in the same pass. The rigid layer 12 is applied in the same lining pass right after the reinforcement fiber is at least substantially fixed and cured on the elastomeric layer 11.

Figure 9:
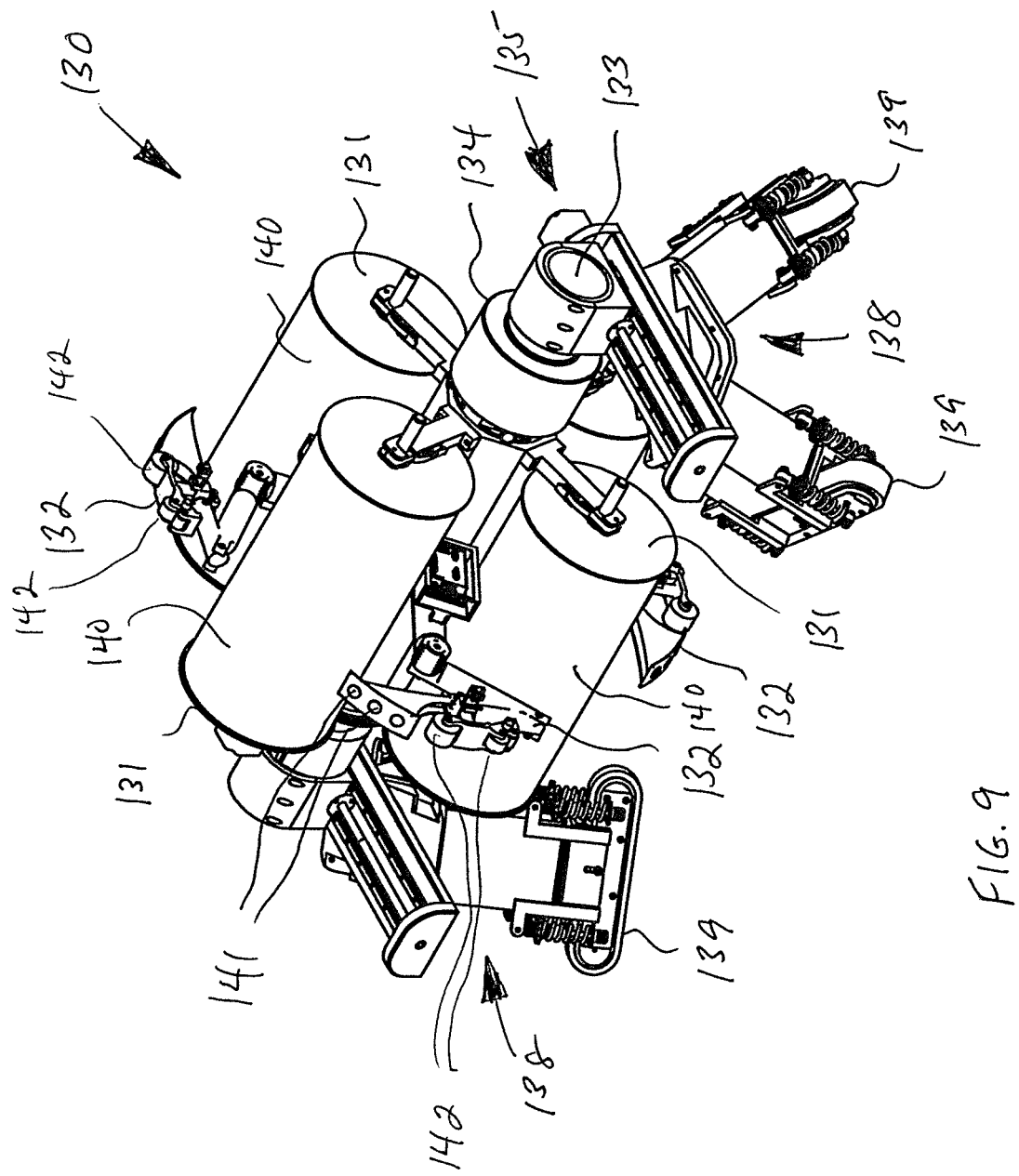
FIG. 9 is a perspective view of a multi-spool embodiment of the inverted filament winder apparatus.
Figure 10:
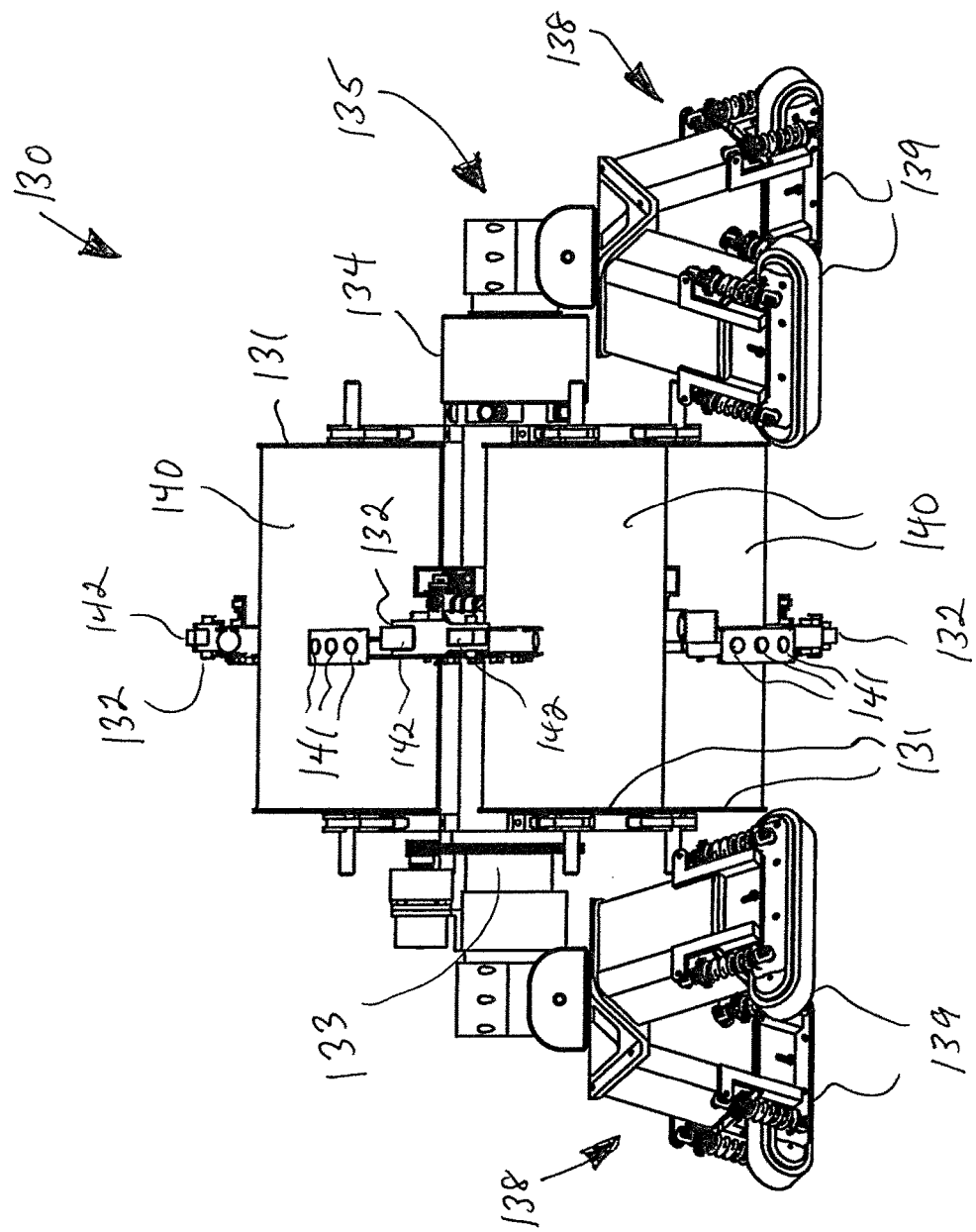
FIG. 10 is a side view of the multi-spool embodiment of FIG. 9.
Figure 11:
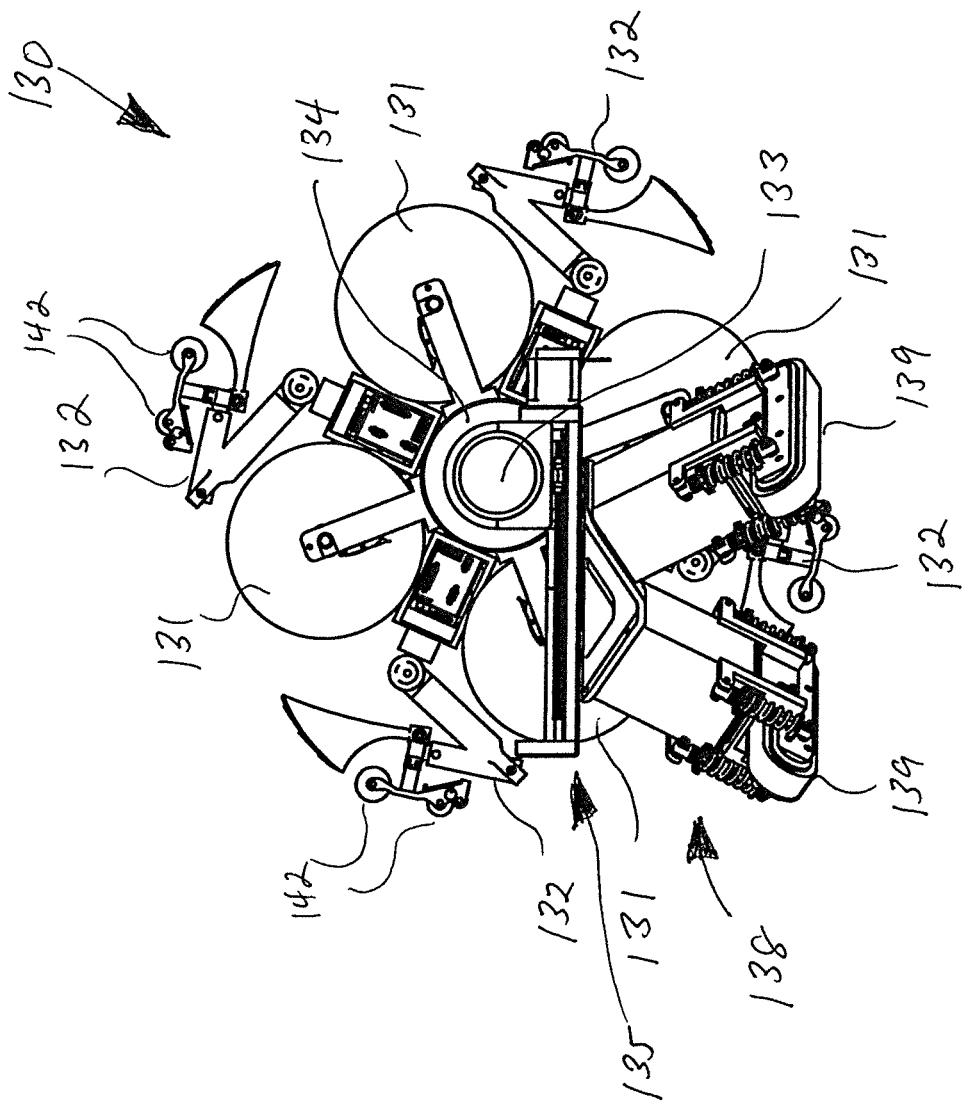
FIG. 11 is an end view of the multi-spool embodiment of FIG. 9.

An alternate embodiment of the inverted filament winding apparatus 130 is illustrated in FIGS. 9 through 11. This embodiment is especially suited for large diameter pipes, but may be sized as needed to be used in pipes of lesser diameters. The apparatus 130 comprises a non-rotating carriage 135 which comprises a transport assembly 138, the transport assembly 138 having rolling members 139, such as wheels, rollers, treads, etc. adapted to allow for transitioning the apparatus 130 through the pipe, the rolling members 139 adapted to remain beneath and support the carriage 135 during the winding operation. The carriage 135 further comprises a rotating member or assembly, such as a central shaft 133 powered by a motor 134, the central shaft 133 having an axis extending or oriented parallel or coaxially in or with the longitudinal central axis of the pipe, i.e., the central shaft 133 is axially oriented in the direction of travel when the apparatus 130 is in use. A plurality of, preferably, free-spinning spools 131, four being shown in the illustrations, are mounted circumferentially about the central shaft 133, equidistantly spaced and having their central axis oriented axially, i.e., parallel to the axis of the central shaft 131 and to the longitudinal central axis of the pipe. An applicator arm 132 is associated with each spool 131, and each spool 131 retains a length of settable filament 140. The applicator arms 132 are oriented such that the press rollers 142 and the filament setting elements 141 are circumferentially aligned. In this manner, filament 140 is drawn from each spool 131 and passed through the associated applicator arm 132, which extends to press or apply the filament 140 onto the interior wall of the pipe or liner as previously discussed, as the central shaft 133 is rotated, which in turn rotates the spools 131 and the applicator arms 132 as the apparatus 130 is advanced through the pipe, thereby producing helical windings on the interior of the pipe or pipe liner.

Because of the plurality of spools 131 and applicator arms 132, the apparatus 130 may be advanced through the pipe at a faster rate, since multiple windings are produced simultaneously. In the embodiment as shown for example, one rotation of the central shaft 133 will produce four windings as opposed to a single winding. The pitch of the windings is determined by the speed of rotation of the central shaft 133 and/or the speed of travel of the apparatus 130.

The applicator arms 131 may be mounted close to each other in the axial direction, such that the windings abut each other, or the applicator arms 131 may be spaced in an offset manner such that the individual windings are spaced apart when applied. The applicator arms 131 may be longitudinally re-positionable, i.e., adjustably mounted onto the central shaft 133 such that alteration of the longitudinal or axial spacing is readily accomplished for different applications. All or some of the applicator arms 131 may be in use for a given application, and the applicator arms 131 may be retractable and extendable to adjust to variations in pipe size and to take into account the location of service leads or the like.

As previously discussed, the settable filament 140 may consist of various materials and embodiments, such as prepreg UV-resin or thermoplastic, UV-settable and/or heat settable, pressure adhesive, open tack, etc., and may be presented in string, web, ribbon or other structural foams. Thus, the apparatus 130 preferably comprises filament setting elements 141 of various types as required, such as UV-lights, infrared lights, heated rollers, radiant heaters, hot air blowers, etc. As discussed, it is preferred that the filament setting elements 141 be disposed on the applicator arms 131 to be near to the filament 140 as it is expelled and applied from the applicator arm 131.

Figure 12:
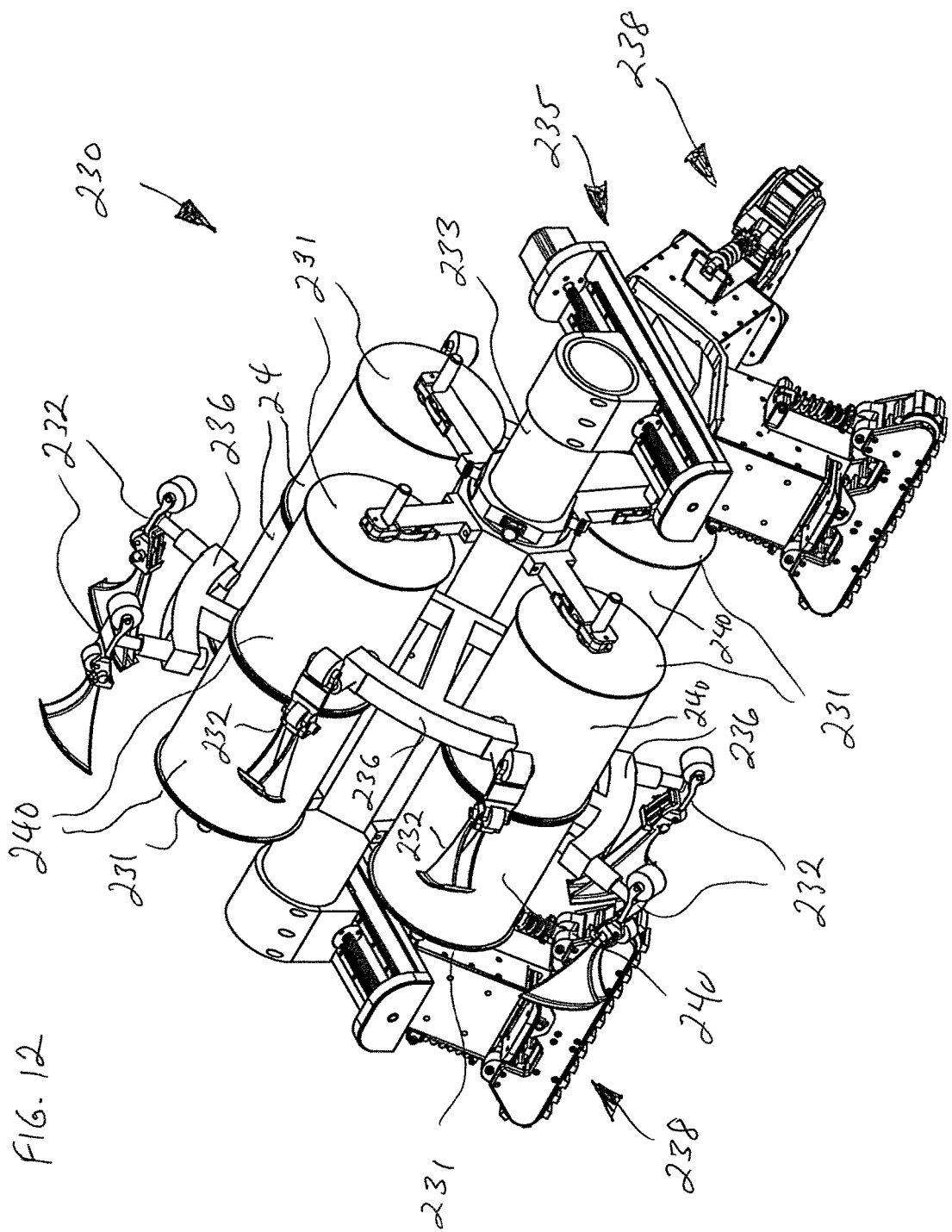
FIG. 12 is a perspective view of an alternative multi-spool embodiment of the inverted filament winder apparatus, this embodiment adapted for axial application of the reinforcement filaments.

Still another alternate embodiment of the inverted filament winding apparatus 230 is illustrated in FIGS. 12 and 13, the filament winding apparatus 230 being adapted to apply the filaments 240 in a substantially axial alignment rather than a helical alignment. As with the multi-spool embodiment of apparatus 130, this apparatus 230 is especially suited for large diameter pipes, but may be sized as needed to be used in pipes of lesser diameters. The apparatus 230 comprises a non-rotating carriage 235 which comprises a transport assembly 238 adapted to allow for transitioning the apparatus 230 through the pipe in the same manner as with apparatus 130. The carriage 235 further comprises a powered rotating member or assembly, such as a central shaft 233, the central shaft 233 having an axis extending or oriented parallel or coaxially in or with the longitudinal central axis of the pipe, i.e., the central shaft 233 is axially oriented in the direction of travel when the apparatus 230 is in use. A plurality of, preferably, free-spinning spools 231, eight being shown in the illustrations, are mounted circumferentially about the central shaft 233, equidistantly spaced and having their central axis oriented axially, i.e., parallel to the axis of the central shaft 231 and to the longitudinal central axis of the pipe. In the embodiment as shown, the spools 231 are paired coaxially. An applicator arm 232 is associated with each spool 231, in this case there being eight applicator arms 232. The applicator arms 232 may be mounted in pairs onto a generally T-shaped arm mount 236. Each spool 231 retains a length of settable filament 240. In this manner, filament 240 is drawn from each spool 231 and passed through the associated applicator arm 232, which extends to press or apply the filament 240 onto the interior wall of the pipe or liner as previously discussed. The applicator arms 232 are oriented such that the press rollers 242 and the filament setting elements 241 are axially aligned. As the central shaft 233 is rotated, which in turn rotates the spools 231 and the applicator arms 232 as the apparatus 230 is advanced through the pipe, the filaments windings 240 are applied in an axial orientation on the interior of the pipe or pipe liner, the pitch of the filament windings 240 being determined by the rate of rotation of the central shaft 233 and/or the speed of travel of the apparatus 240. The filaments 240 may be applied in parallel to the central axis of the pipe or pipe liner by not rotating the spools 231 and applicator arms 232 about the central shaft 233.

The applicator arms 231 may be circumferentially re-positionable, i.e., adjustably mounted onto the arm mounts 236 such that alteration of the circumferential spacing of the applied filament 240 is readily accomplished for different applications. All or some of the applicator arms 231 may be in use for a given application, and the applicator arms 231 may be retractable and extendable to adjust to variations in pipe size and to take into account the location of service leads or the like.

As previously discussed, the settable filament 240 may consist of various materials and embodiments, such as prepreg UV-resin or thermoplastic, UV-settable and/or heat settable, pressure adhesive, open tack, etc., and may be presented in string, web, ribbon or other structural forms. Thus, the apparatus 230 preferably comprises filament setting elements 241 of various types as required, such as UV-lights, infrared lights, heated rollers, radiant heaters, hot air blowers, etc. As discussed, it is preferred that the filament setting elements 241 be disposed on the applicator arms 231 to be near to the filament 240 as it is expelled and applied from the applicator arm 231.

It is understood that equivalents and substitutions to some of the elements and steps disclosed above may be obvious to those of skill in the art, and therefore the true scope and definition of the invention is to be as set forth in the following claims.

I claim:

1. An inverted filament winder apparatus adapted to apply settable filaments to the interior wall of a pipe or pipe liner having a longitudinal central axis, said apparatus comprising:
   a non-rotating carriage comprising a rotating assembly and a transport assembly, wherein said rotating assembly comprises a central shaft and a motor, said central shaft having an axis oriented parallel to the longitudinal central axis of the pipe or pipe liner when the apparatus is applying settable filaments to the interior wall of the pipe or pipe liner, said central shaft axis defining an axial direction;
   a plurality of spools circumferentially mounted to said rotating assembly, each of said spools comprising an axis oriented parallel with said central shaft axis, each of said spools adapted to retain one of said settable filaments thereon;
   a plurality of applicator arms, each said applicator arm associated with one of said spools, whereby one of said settable filaments is passed through each said applicator arm to be applied to the interior of a pipe;
   wherein each of said spools and each of said applicator arms rotate circumferentially about said rotating assembly when said rotating assembly is rotating.

2. The apparatus of claim 1, wherein said transport assembly comprises rolling members, said transport assembly adapted to transport said non-rotating carriage through pipe or pipe liner.

3. The apparatus of claim 1, further comprising filament setting elements and press rollers.

4. The apparatus of claim 3, wherein said filament setting elements and press rollers are disposed on said applicator arms.

5. The apparatus of claim 4, said filament setting members being chosen from the group of filament setting members consisting of UV-lights, infrared lights, and heating elements.

6. The apparatus of claim 1, wherein said applicator arms are spaced in the axial direction in offset manner.

7. The apparatus of claim 6, wherein said applicator arms are re-positionable in the axial direction.

8. The apparatus of claim 4, wherein said filament setting elements and press rollers are aligned circumferentially.

9. The apparatus of claim 4, wherein said filament setting elements and press rollers are aligned in the axial direction.

10. The apparatus of claim 1, wherein said spools are circularly disposed about said central shaft axis.

11. An inverted filament winder apparatus adapted to apply a plurality of settable filaments to the interior wall of a pipe or pipe liner having a longitudinal central axis, said apparatus comprising:
    a non-rotating carriage comprising a rotating assembly and a transport assembly;
    said rotating assembly comprising a central shaft and a motor, said central shaft having an axis, said central shaft axis defining an axial direction, said motor adapted to rotate said central shaft about said central shaft axis;
    a plurality of spools circumferentially mounted to said rotating assembly, each of said spools having an axis being parallel to said central shaft axis, each of said spools being adapted to retain one of said settable filaments thereon;
    a plurality of applicator arms, each said applicator arm associated with one of said spools, whereby one of said settable filaments is passed from each of said spools through one of said applicator arms to be applied to the interior of a pipe;
    filament setting elements and press rollers;
    wherein each of said spools and each of said applicator arms rotate circumferentially about said rotating assembly when said central shaft is rotating.

12. The apparatus of claim 11, wherein said applicator arms are spaced in the axial direction in offset manner.

13. The apparatus of claim 11, wherein said filament setting elements are disposed on each of said applicator arms and wherein said filament setting members are chosen from the group of filament setting members consisting of UV-lights, infrared lights, and heating elements.

14. The apparatus of claim 11, wherein said filament setting elements and press rollers are aligned circumferentially.

15. The apparatus of claim 11, wherein said filament setting elements and press rollers are aligned in the axial direction.

16. The apparatus of claim 11, wherein said spools are circularly disposed about said central shaft axis.

17. The apparatus of claim 11, wherein said applicator arms are re-positionable in the axial direction.

18. An inverted filament winder apparatus adapted to apply a plurality of settable filaments to the interior wall of a pipe or pipe liner having a longitudinal central axis, said apparatus comprising:

a non-rotating carriage comprising a rotating assembly and a transport assembly;

said rotating assembly comprising a central shaft and a motor, said central shaft having an axis, said central shaft axis defining an axial direction, said motor adapted to rotate said central shaft about said central shaft axis;

a plurality of spools circumferentially mounted to said rotating assembly, each of said spools having an axis being parallel to said central shaft axis, each of said spools being adapted to retain one of said settable filaments thereon, and wherein said spools are circularly disposed about said central shaft axis;

a plurality of applicator aims spaced in the axial direction in offset manner, each said applicator arm associated with one of said spools, whereby one of said settable filaments is passed from each of said spools through one of said applicator arms to be applied to the interior of a pipe;

filament setting elements and press rollers;

wherein each of said spools and each of said applicator arms rotate circumferentially about said rotating assembly when said central shaft is rotating.

19. The apparatus of claim 18, wherein said applicator arms are re-positionable in the axial direction.

\* \* \* \* \*